United States Patent [19]

Watanabe et al.

[11] Patent Number: 4,594,758

[45] Date of Patent: Jun. 17, 1986

[54] METHOD OF PRODUCING AN ELECTRICAL DOUBLE LAYER CAPACITOR

[75] Inventors: Kohichi Watanabe; Michihiro Murata, both of Kyoto, Japan

[73] Assignee: Murata Manufacturing Co., Ltd., Nagaokakyo, Japan

[21] Appl. No.: 622,735

[22] Filed: Jun. 20, 1984

[30] Foreign Application Priority Data

Jun. 21, 1983 [JP] Japan ................................ 58-111568

[51] Int. Cl.$^4$ ............................................ H01G 13/00
[52] U.S. Cl. ..................................................... 29/25.42
[58] Field of Search ............................. 29/25.41, 25.42

[56] References Cited

U.S. PATENT DOCUMENTS 3,683,469  8/1972  Capek et al. ...................... 29/25.42

Primary Examiner—Howard N. Goldberg
Assistant Examiner—Timothy V. Eley
Attorney, Agent, or Firm—Finnegan, Henderson, Farabow, Garrett & Dunner

[57] ABSTRACT

A method of making a double layer capacitor that is not susceptible to short-circuits due to smearing of conductive material along the edges during cutting. The device is formed with the bonding agent between an outer conductive member and an inner resilient insulator in a semi-hardened state. After initial fabrication and cutting, the device is compressed and the bonding agent completely hardened while the device is under compression. Release of the pressure sets up shear stresses that fracture any conductive material bridging the resilient insulating members and creates step portions at the exterior interface of the conductive material and the resilient insulator.

7 Claims, 5 Drawing Figures

METHOD OF PRODUCING AN ELECTRICAL DOUBLE LAYER CAPACITOR

BACKGROUND OF THE INVENTION

1. Field of the Invention

The present invention relates to a method of producing an electrical double layer capacitor and particularly to a method of producing an electrical double layer capacitor including a step of cutting such a capacitor into a desired shape by means of a die or the like.

2. Description of the Prior Art

FIG. 1 is a cross-sectional view of a structure of an electrical double layer capacitor which is improved by the present invention. The electrical double layer capacitor as shown here comprises a pair of polarization electrodes 2 separated by a separator 1 comprised of an electronically non-conductive porous polyolefin material. The polarization electrodes are formed mainly out of activated charcoal and a dilute sulfuric acid electrolyte. A pair of current collecting electrodes 3 are put into contact with the respective polarization electrodes 2 to act as terminals of the electrical double layer capacitor. The current collecting electrodes 3 are comprised, for example, of a conductive rubber sheet.

A pair of insulator members 4 are used to maintain the above-mentioned separator 1, the polarization electrodes 2, and the current collecting electrodes 3 in the desired arrangement. That is, each of the insulator members 4 form an opening 5 for receiving the polarization electrode 2, and the separator 1 is sandwiched between and fixed to the insulator members 4. Then the current collecting electrodes 3 are bonded to the periphery of the thus formed structure.

In producing electrical double layer capacitors having such a shape as shown in FIG. 1, conventionally, means such as a metal die have been used for cutting the periphery of a semi-processed structure in an intermediate step to obtain such an electrical double layer capacitor. Therefore, there was a tendency that the conductive resin material forming the current collecting electrode 3 was smeared on the end surface of the periphery of the insulator member 4 after the cutting step, as shown in FIG. 2 as the smeared portion 6. There was a disadvantage, therefore, that such a smeared portion 6 of the conductive resin material caused a short-circuit between the upper and lower current collecting electrodes 3, as shown in FIG. 2. This increases the leakage current, reduces the breakdown voltage and insulation capacity of the device.

An object of the present invention is therefore to provide a method of producing an electrical double layer capacitor in which, even if such a smearing of the current carrying electrodes occurs, it has no effect on the performance of the device.

SUMMARY OF THE INVENTION

The present invention overcomes the problems and disadvantages of the prior art by providing a method of producing an electrical double layer capacitor wherein a separator is placed between an opposed pair of elastically deformable insulating members. The separator is bonded to the insulating members to form openings disposed to receive a polarization electrode. The openings are filled with material disposed to form the polarization electrodes on opposite sides of the separator. Current carrying electrodes, comprised of an electrically conductive resin in the semi-hardened state, are bonded to the insulating members with a bonding agent to form a bonded structure. The periphery of the bonded structure is then cut to the desired shape. The bonded structure is pressed to deform the insulating members and in this state the current conductive resin and the bonding agent are completely hardened. The pressure is then released from the bonded structure.

In such a manner, the conductive material forming the current carrying electrodes that may be smeared along the insulating members by the cutting operation is interrupted so that it cannot short-circuit the capacitor.

DESCRIPTION OF THE PREFERRED EMBODIMENTS

Figure 1:
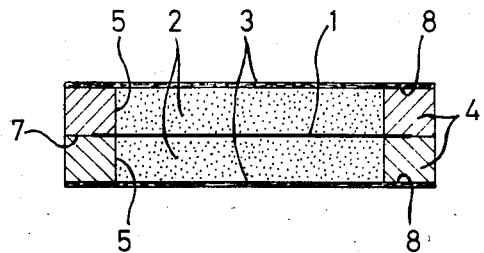
FIG. 1 is a cross section showing the structure of an electrical double layer capacitor.

An embodiment of the method of producing an electrical double layer capacitor according to the present invention will be described.

Turning back to FIG. 1, a separator 1 is placed between a pair of elastically deformable insulator members 4 of an insulating material, such as insulator rubber. The separator 1 and the insulating members 4 are bonded to each other at bonding portions 7 and then bonding portions 7 are completely hardened. For example, a gum bonding agent may be used at the bonding portions 7.

Next, a polarization electrode 2 is filled in the opening 5 formed by the upper and lower insulator members 4 and the separator 1. Current collecting electrodes 3 of a conductive resin material, such as conductive rubber in the semihardened state or in the hardened state, are bonded at bonding portions 8 to the upper and lower sides respectively of insulator members 4 to form a bonded structure. At this time, the bonding portions 8 are left in the semi-hardened or unhardened state. A gum bonding agent may be used at the bonding portions 8.

Figure 2:
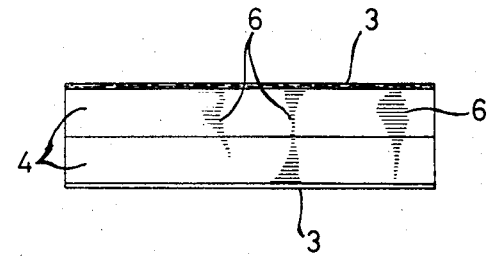
FIG. 2 is a side view of an electrical double layer capacitor.

Next, by die cutting or the like, the periphery of the bonded structure is cut to obtain a desired shape as shown in FIG. 1. Upon completion of this step, a smeared portion 6 as shown in FIG. 2 may have been formed.

Figure 3:
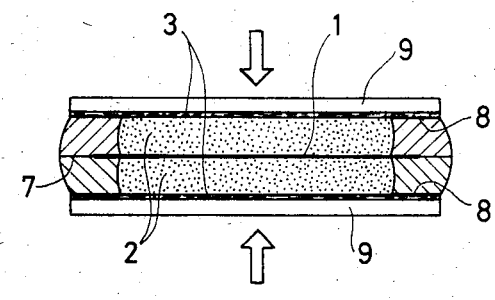
FIG. 3 is a cross section showing the pressing of the device by plates 9.

Then, as shown in FIG. 3, a pair of pressing plates 9 of, for example, a metal material, are placed on the upper and lower surfaces of the bonded structure and moved closer to each other to press the bonded structure in a direction perpendicular to the planar surface. At this time, the insulator members 4 are deformed in the lateral direction as is most clearly depicted by the arrow 11 in FIG. 4. Although each of the current collecting electrodes 3 may also be deformed in the lateral direction, each of the current collecting electrodes 3 is thinner than each of the insulator members 4 and, therefore, the extent of the deformation of the current collecting electrode 3 in the lateral direction is smaller than that of the insulator member 4. As a result, shearing stress is produced at the bonding portions 8 as indicated by arrows 10 and 11 as shown in FIG. 4.

Figure 4:
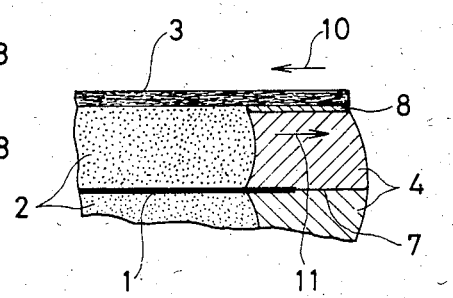
FIG. 4 is an enlarged partial cross section showing the shearing stress at the bonding portions 8.
Figure 5:
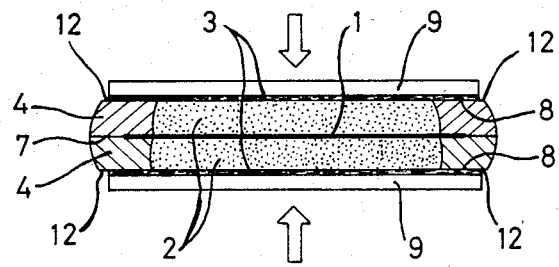
FIG. 5 is a cross section showing the resulting step portions 12 produced as a result of pressing.

Due to the shearing stress shown in FIG. 4, step portions 12 are produced between the current collecting electrode 3 and the insulator member 4, as shown in FIG. 5. This results in at least a gap between the smeared portion 6 (FIG. 2) and the current collecting electrode 3. With the device in the state depicted in FIG. 5, the bonding portions 8 are subject to a complete hardening process. Then the pressure from the pressing plates 9 is removed and a desired electrical double layer capacitor is obtained.

In the electrical dual layer capacitor thus obtained, the bonding portions 8 have been completely hardened so that the step portions 12 between each of the current collecting electrodes 3 and the corresponding insulator member 4 remains. Thus, short-circuits between each of the current collecting electrodes 3 and the smeared portion 6 which may have been produced are prevented.

As described above, the electrical double layer capacitor obtained by the method of the present invention does not have faults in the insulation due to smeared material from the cutting operation. The prevention of such defects allows manufacturing to be achieved with good yields. Further, the steps of pressing the bonded structure is a very simple one and therefore it does not adversely affect production rate of such devices, even in the case where mass production is required.

The present invention has been disclosed in terms of a preferred embodiment. The invention, however, is not limited thereto. The scope of the invention is determined by the appended claims and their equivalents.

What is claimed is:

1. A method of producing an electrical double layer capacitor, said method comprising the steps of:
    placing a separator between an opposed pair of elastically deformable insulating members and bonding said separator thereto to form openings on opposite sides of said separator;
    filling said openings with material disposed to form polarization electrodes on opposite sides of said separator;
    bonding current carrying electrodes comprised of an electrically conductive resin in the semi-hardened state to said insulating member with a bonding agent to form a bonded structure;
    cutting the periphery of said bonded structure to the desired shape thereby forming an outer edge at said periphery; and
    pressing the bonded structure to deform the insulating members and in this state completely hardening said current conductive resin and said bonding agent.

2. The method of claim 1 wherein said insulating members form the outer edge of said capacitor.

3. The method of claim 2 wherein said capacitor is a planar member and said insulating members form the outer edge of said planar capacitor.

4. The method of claim 3 wherein the step of pressing comprises compression of said bonded structure in a direction generally perpendicular to the planar portions of said planar member.

5. The method of claim 1 wherein said capacitor includes an exterior surface adjacent said outer edge and wherein the step of cutting of the periphery of said bonded structure smears material forming said current carrying electrodes on the exterior surface of said insulating members.

6. The method of claim 5 including the step of fracturing said material smeared on said exterior surface by pressing said bonded structure.

7. A method of producing a generally planar electrical double layer capacitor, said method comprising the steps of:
    bonding a generally planar separator between elastically deformable insulating members to form a generally planar opening on opposite sides of said separator;
    forming polarization electrodes by filling said openings with a material disposed to form said polarization electrodes;
    bonding generally planar current carrying electrodes to each of said polarization electrodes with a bonding agent to form a generally planar bonded structure having an opposed pair of outer electrodes, said current carrying electrodes comprising an electrically conductive material in the semi-hardened state;
    cutting the periphery of said bonded structure;
    compressing said insulating members;
    hardening said current carrying electrodes while said insulating members are compressed; and
    hardening said bonding agent.

* * * * *